(12) United States Patent
Aldis et al.

(10) Patent No.: US 9,253,234 B2
(45) Date of Patent: *Feb. 2, 2016

(54) METHOD AND APPARATUS FOR PROVIDING ENHANCED STREAMING CONTENT DELIVERY WITH MULTI-ARCHIVE SUPPORT USING SECURE DOWNLOAD MANAGER AND CONTENT-INDIFFERENT DECODING

(71) Applicant: Arvato Digital Services LLC, New York, NY (US)

(72) Inventors: David Aldis, Surrey (CA); Kenneth Brown, Portland, OR (US); Andrew Gallant, Orleans (CA)

(73) Assignee: Arvato Digital Services LLC, Valencia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/322,528

(22) Filed: Jul. 2, 2014

(65) Prior Publication Data

US 2015/0081849 A1 Mar. 19, 2015

Related U.S. Application Data

(63) Continuation of application No. 13/118,346, filed on May 27, 2011, now Pat. No. 8,799,411.

(60) Provisional application No. 61/344,134, filed on May 28, 2010.

(51) Int. Cl.
*G06F 15/16* (2006.01)
*H04L 29/06* (2006.01)
(Continued)

(52) U.S. Cl.
CPC ............ *H04L 65/60* (2013.01); *H04L 65/4084* (2013.01); *H04L 67/02* (2013.01); *H04N 21/26258* (2013.01); *H04N 21/4405* (2013.01); *H04N 21/472* (2013.01); *H04N 21/47202* (2013.01); *H04N 21/654* (2013.01); *H04N 21/6582* (2013.01); *H04N 21/8193* (2013.01); *H04L 63/0428* (2013.01)

(58) Field of Classification Search
CPC .......................... H04N 24/472; H04N 24/654
USPC ......................................................... 709/219
See application file for complete search history.

(56) References Cited

U.S. PATENT DOCUMENTS 7,512,972 B2 * 3/2009 de Jong ............. H04L 29/06027
380/255
7,590,644 B2 * 9/2009 Matsakis ................... G06F 8/41
(Continued)

*Primary Examiner* — Imad Hussain
(74) *Attorney, Agent, or Firm* — Dickinson Wright PLLC

(57) ABSTRACT

A system, apparatuses and methods are provided to download and process data and other content streamed over a wide area network using one or more dynamically fetched, material specific, data handlers (e.g., download assistants). A download assistant fetches a data stream from a remote location and processes the streamed data iteratively using buffers and multi-threaded processes through the decoder (e.g., codec), allowing source material-specific processing of the data as it is streamed from one or more download sources as well as content-indifferent and platform-indifferent decoding. To minimize versioning issues, payload construction for secure delivery is simplified to packing and encrypting a directory tree containing any number of files or other digital media into an archive and, when needed, dividing a payload into multiple files or archives with a descriptor that lists the archives.

10 Claims, 7 Drawing Sheets

(51) Int. Cl.
*H04N 21/654* (2011.01)
*H04N 21/472* (2011.01)
*H04N 21/262* (2011.01)
*H04N 21/4405* (2011.01)
*H04N 21/658* (2011.01)
*H04N 21/81* (2011.01)
*H04L 29/08* (2006.01)

(56) References Cited

U.S. PATENT DOCUMENTS

| | | | | |
|---|---|---|---|---|
| 7,707,273 | B2* | 4/2010 | Jones | G06F 17/30058 709/219 |
| 7,853,686 | B2 | 12/2010 | Shin et al. | |
| 2003/0014436 | A1* | 1/2003 | Spencer | G06Q 10/10 715/201 |
| 2003/0014496 | A1* | 1/2003 | Spencer | H04L 29/06 709/217 |
| 2004/0024688 | A1* | 2/2004 | Bi | G06F 21/10 705/37 |
| 2005/0033774 | A1 | 2/2005 | Brentano et al. | |
| 2005/0132083 | A1* | 6/2005 | Raciborski | G06F 21/10 709/232 |
| 2005/0198061 | A1 | 9/2005 | Robinson et al. | |
| 2007/0112786 | A1* | 5/2007 | Shin | H04N 21/26208 |
| 2007/0201502 | A1* | 8/2007 | Abramson | H04L 67/32 370/429 |
| 2007/0204057 | A1* | 8/2007 | Shaver | G06F 17/30902 709/231 |
| 2007/0209005 | A1* | 9/2007 | Shaver | G06F 17/3089 715/733 |
| 2007/0220051 | A1 | 9/2007 | Brentano et al. | |
| 2008/0162307 | A1* | 7/2008 | Hirsch | G06Q 10/06375 705/26.1 |
| 2009/0064135 | A1* | 3/2009 | Jimmerson | G06F 8/61 717/178 |
| 2010/0057884 | A1* | 3/2010 | Brownell | H04N 7/17318 709/219 |
| 2010/0088310 | A1* | 4/2010 | Daugherty | G06F 17/30675 707/722 |
| 2013/0124696 | A1* | 5/2013 | Chu | G06F 21/121 709/219 |
| 2013/0212686 | A1* | 8/2013 | Palaniappan | H04L 63/123 726/26 |

* cited by examiner

METHOD AND APPARATUS FOR PROVIDING ENHANCED STREAMING CONTENT DELIVERY WITH MULTI-ARCHIVE SUPPORT USING SECURE DOWNLOAD MANAGER AND CONTENT-INDIFFERENT DECODING

This application is a continuation of U.S. patent application Ser. No. 13/118,346, filed May 27, 2011, which claims the benefit of U.S. provisional application Ser. No. 61/344,134, filed May 28, 2010, the entire contents of which are incorporated herein by reference.

CROSS-REFERENCE TO RELATED PATENT APPLICATIONS

Related subject matter is disclosed and claimed in U.S. patent application Ser. No. 11/976,432, filed Oct. 24, 2007 (now issued as U.S. Pat. No. 7,882,037), which claims the benefit of provisional U.S. Patent Application Ser. No. 60/853,766, filed Oct. 24, 2006, the entire contents of which are incorporated herein by reference.

BACKGROUND OF THE INVENTION

1. Field of the Invention

The present invention relates to a system, apparatus and method for providing secure distribution of electronic software, media and other content, and more particularly to a system, apparatus and method for processing streaming data using enhanced data handlers or data processing decoders.

2. Description of the Related Art

Electronically distributable digital content takes many forms such as software applications, music and video files, documents, licenses, and so on. Each of these forms of content requires specialized processing on a user's desktop when they are executed or viewed.

The typical size of downloadable content is increasing. For example, as software applications become more complex and include more multimedia content, they are increasing in size. As the demand for greater and greater quality increases, the resolution and therefore size of music and video files is also increasing.

The increasing file sizes of electronically distributable digital content can create long delays before requested content is accessible by the user because processing is typically delayed until the download completes. For example, a download must typically be completed before the downloaded content can be used. Further, existing content delivery methods require sending compressed archives that are decompressed only after the download is complete. This is wasteful in terms of space and time.

Thus, a need exists for a system to download content to users more efficiently to allow for more rapid access and use of the downloaded content by the user.

Prior to the system described in U.S. Pat. No. 7,882,037, no software technology existed that allowed consumers or online purchasers of content, content retailers, and software manufacturers (e.g., publishers) to ubiquitously engage in electronic software distribution (ESD), for example. A major shortcoming of digital content delivery technologies had been the inability to provide both security and scalability. The system described in U.S. Pat. No. 7,882,037 (hereinafter referred to as the retail electronic distribution platform) allows for an unlimited number of manufacturers, retailers, and consumers to interconnect using a common platform and provides service for completely seamless, secure, scalable and electronic distribution of (unlimited) digital goods. The retail electronic distribution platform employs a download assistant instantiated using server technology, and an installation assistant that manages communication with a server farm. The installation assistant is downloaded onto the purchaser's computer and manages processing, verification and authentication of downloaded content requested by the purchaser, whereas the download assistant manages delivery of the requested content to the purchaser's computer.

The installation assistant used with the retail electronic distribution platform can require additional processing and memory space for certain platforms (e.g., operating systems on users' computers) as compared with other platforms, thereby restricting the size of downloaded files that can be processed using those platforms. For example, to implement the installation assistant in certain platforms on users' computers, multiple copies (i.e., multiple footprints) of a downloaded content file may be required.

Existing content delivery systems can also fail to achieve symmetrical encryption and decryption of content files developed in accordance with one platform, but decrypted and rendered in a different platform.

Accordingly, there is a need for an improved content delivery system that can provide efficient processing, verification, authentication and decryption of downloaded content regardless of platform or operating system (e.g., various PC-based OSs, Mac and so on) and that can support differing content structures and formats.

SUMMARY OF THE INVENTION

Illustrative embodiments of the present invention address at least the above problems and/or disadvantages and provide at least the advantages described below. Accordingly, an aspect of illustrative embodiments of the present invention is to provide content delivery processing and actions while the streaming of the data corresponding to the content is occurring as opposed to waiting for download, encryption, delivery, delivery completion and decryption operations to occur. It is another aspect of exemplary embodiments of the present invention to employ codec based methods that utilize the streaming and provide cross-platform support as well as support for different types of content.

In accordance with an illustrative embodiment of the present invention, a method of preparing encrypted content for delivery to users is provided, the content being stored at a server for delivery to users upon request and encrypted. The method comprises:

storing a plurality of download assistants and a plurality of codecs;

receiving a request for selected content from a user;

generating a manifest comprising a listing of each file in a payload needed to fulfill an order to deliver the selected content to the user and an order number to identify the order;

selecting a download assistant from among the plurality of download assistants to facilitate the fulfillment of the order, and a selecting a codec from among the plurality of codecs;

transmitting to the user a link corresponding to the selected download assistant for accessing the selected download assistant;

providing the download assistant with the manifest, a link to the selected codec, and a link to the payload;

loading the selected codec into the download assistant; and streaming the payload to iteratively place content from each file in the manifest into buffers via the selected download assistant, and decrypting and unpacking the buffers via the selected codec to provide the selected content to the user.

In accordance with an aspect of illustrative embodiments of the present invention, the streaming comprises employing separate threads for the selected download assistant and the selected codec, respectively, to stream each file in the manifest into buffers, and to decrypt and unpack the buffers.

In accordance with another aspect of illustrative embodiments of the present invention, the plurality of download assistants can comprise download assistants for managing different platforms, different user devices, different operating systems, different methods of rendering content for the user, and different types of content. A secure download API can be used instead of selecting a download assistant. The streaming can then employ the download API instead of the selected download assistant.

In accordance with another aspects of illustrative embodiments of the present invention, the plurality of codecs can comprise different codecs to handle different types of streams or content, and different methods of rendering content for the user. The selected codec is a dynamic link library (DLL).

In accordance with yet another aspect of illustrative embodiments of the present invention, the payload for the selected content is prepared for storage on the server by packing and encrypting a directory structure containing at least one of a file and digital media into an archive.

In accordance with still yet another aspect of illustrative embodiments of the present invention, the payload can be divided into multiple archives with a descriptor that lists the archives when the at least one of a file and digital media exceed a selected size limit, and the streaming can employ the descriptor to facilitate unpacking the buffers.

In accordance with still yet another aspect of illustrative embodiments of the present invention, a token corresponding to the selected download assistant can be associated with the order number. The download assistant is not provided with the manifest, a link to the selected codec, and a link to the payload until verification of the download assistant using the token is successful.

Other aspects, advantages, and salient features of the invention will become apparent to those skilled in the art from the following detailed description, which, taken in conjunction with the annexed drawings, discloses illustrative embodiments of the invention.

BRIEF DESCRIPTION OF THE DRAWINGS

The above and other aspects, features, and advantages of illustrative embodiments of the present invention is more apparent from the following description taken in conjunction with the accompanying drawings, in which.

Throughout the drawings, the same drawing reference numerals are understood to refer to the same elements, features, and structures.

DETAILED DESCRIPTION OF ILLUSTRATIVE EMBODIMENTS

The matters exemplified in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Furthermore, the terms used herein are defined according to the functions of illustrative embodiments of the present invention. Thus, the terms may vary depending on a user's or an operator's intention and usage.

Figure 1:
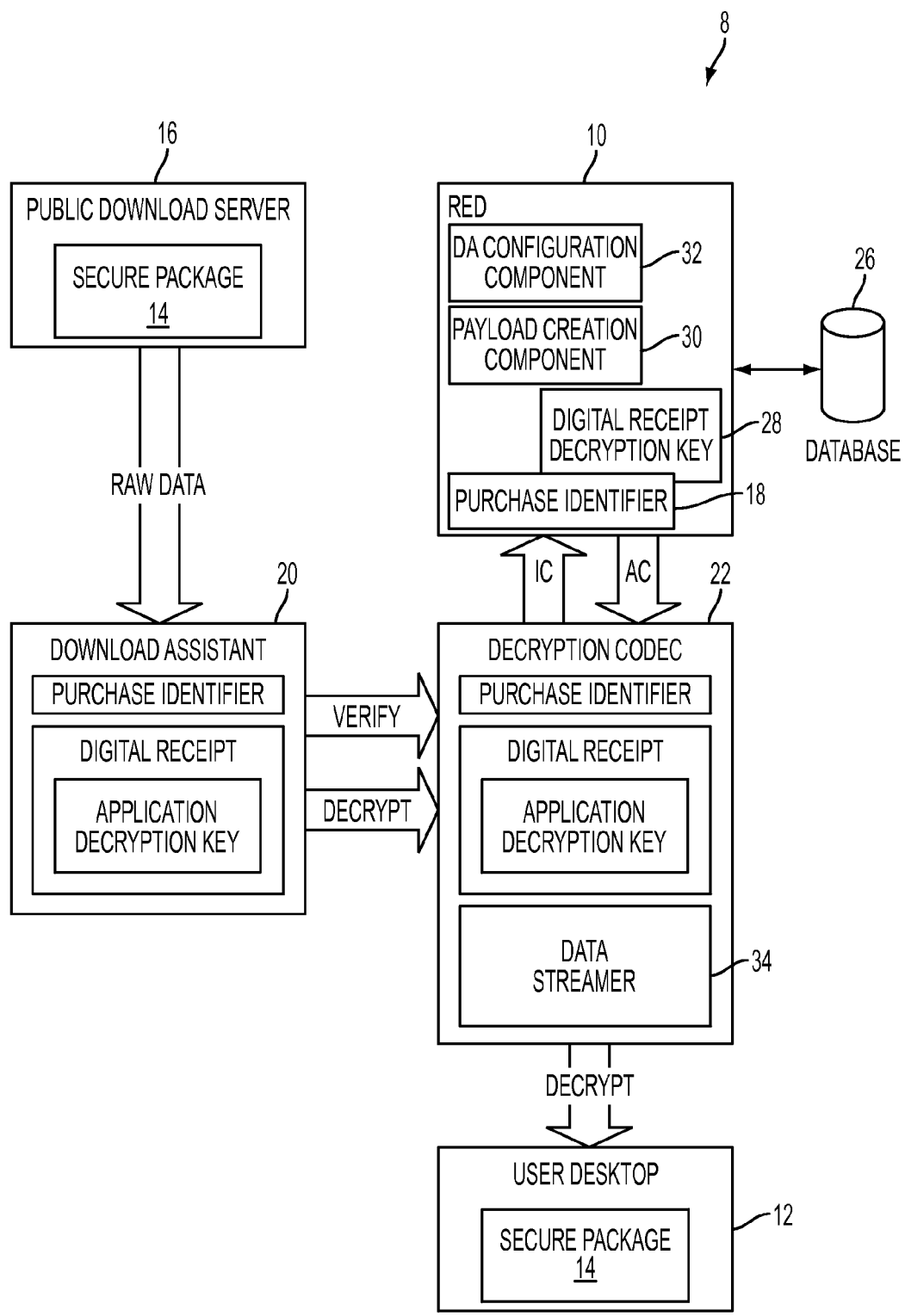
FIG. 1 depicts an improved content delivery system in accordance with an illustrative embodiment of the present invention.

A RED 10 is shown in FIG. 1 in accordance with illustrative embodiments of the present invention. A user 12 seeks to download a secure package 14 of content from a download server 16 (e.g., a public download server). The enhanced retail electronic distribution platform (hereinafter "RED") 10 builds manifests or lists of files needed to fulfill users' orders and assigns the orders with corresponding order numbers or purchase identifiers 18. Digital Assistants (DAs) 20 are preferably pre-built with corresponding tokens that are stored in the RED. The DAs 20 can be stored at the RED 10 or can be stored anywhere (e.g., any public or private network). When a user 12 makes an order to download content, the RED 10 provides a link to a DA 20 assigned for that order, that is, the DA's token and the order's purchase identifier are linked. The DA 20 calls RED 10 to obtain the manifest corresponding to the purchase identifier, and the RED 10 verifies the DA 20 using the token. The RED 10 provides the DA 20 with a download URL response that can comprise URLs for a codec 22, the payload 14 requested by the user, among other items such as branding information.

With continued reference to FIG. 1, a decryption codec 22 is provided that, like the DA 20, can be stored at the RED 10 or can be stored anywhere (e.g., any public or private network). The DA 20 assigned to the order requests the codec 22 indicated in the download URL response. The codec 22 generates an installation code (IC) and provides it to the RED 10 server, and the RED 10 returns an activation code if verification is successful. The codec 22 provides the verification result to the DA 20. If verification is achieved, the DA 20 can commence processing the payload 14 or secure package. The DA 20 streams packed and encrypted payload data into buffers processed by the codec 22. The codec 22 decrypts and unpacks the buffers as they are received. Thus, the DA 20 and codec 22 perform iterative and multi-threaded processes to download the requested secure package.

As described in more detail below and in accordance with illustrative embodiments of the present invention, an improved content delivery system 8 is provided wherein the DA 20 exemplified in FIG. 1 is preferably responsible for downloading all content and support files. The DA 20 can be an initial "seed" executable or it can be an installed application. In either case, it consumes the same services and utilizes the same over-all architecture. The installation assistant described above in connection with the retail electronic distribution platform of U.S. Pat. No. 7,882,037 is replaced by the codec 22 illustrated in FIG. 1 (e.g., a dynamic-link library (DLL) file or other code that the DA 20 runs to perform extended functionalities). Thus, the payload 14 or secure package is no longer attached as a payload to an executable installation assistant and instead is just encrypted data.

These aspects of the improved content delivery system 8 exemplified in FIG. 1 eliminate several shortcomings of existing content delivery systems. For example, a relatively large file will not require 30 minutes or more for certain platforms to examine for security threats. The DA 20 exemplified in FIG. 1 is simplified and therefore overcomes significantly increased processing delays of the download assistant exemplified in of U.S. Pat. No. 7,882,037, because there will be no need to extend the DA's functionality beyond the need to download a set of files and load a DLL or codec 22. Management and versioning for the digital assistant and installation assistant (IA) described in U.S. Pat. No. 7,882,037 or any similar configuration is essentially eliminated because of the separation of the IA and payload in accordance with illustrative embodiments of the invention as illustrated in FIG. 1. Unlike the installation assistant in U.S. Pat. No. 7,882,037, the DLL or codec 22 can be easily versioned. Because the payload 14 is merely encrypted data that can be easily recovered using generic decryption routines, it is not be necessary to save a gold master on the server. Because it is not necessary to provide proprietary code such as an installation assistant on the desktop 12, it is easier and more secure for a future feature to prepare and upload the payload directly to the download server 16.

Download Assistant (DA) 20

Figure 2:
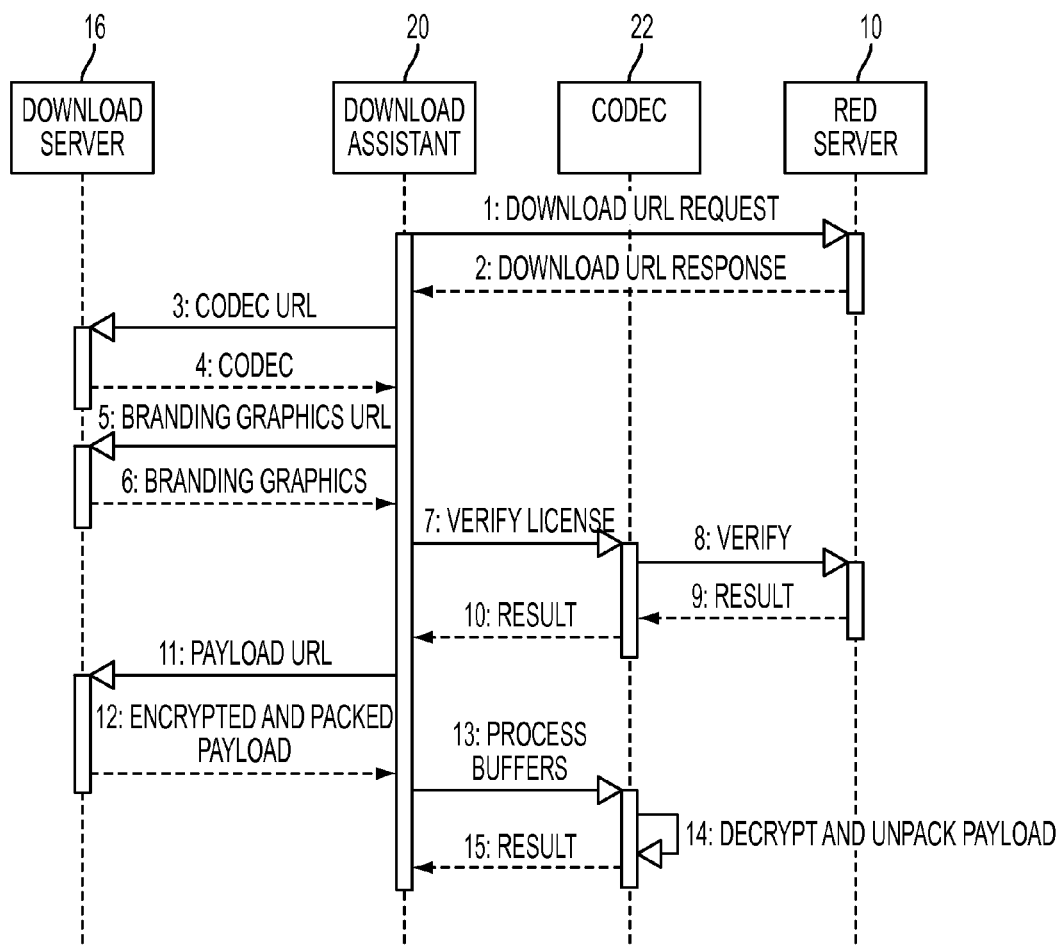
FIG. 2 illustrates a sequence of operations for the digital assistant in accordance with an illustrative embodiment of the present invention.

FIG. 2 illustrates a sequence of operations 1 through 15 for the DA 20 in accordance with an illustrative embodiment of the present invention.

1. The DA 20 makes the "Download URL Request".
2. The URLs for branding collateral, the codec 22, and the payload 14 are returned. The RED server 10 also returns the serial number.
3. The DA 20 requests the codec 22.
4. The codec 22 is saved to a Vista-compliant temporary folder, for example, and loaded into the DA 20.
5. The DA 20 requests trial branding graphics when appropriate.
6. The trial graphic are received and saved to the system for later use by a verifier.
7. The DA 20 calls the codec 22 to verify the download license.
8. The codec 22 generates an installation code and sends it to the server 10.
9. The RED server 10 does a check against download tolerance where applicable and returns an activation code.
10. The codec 22 returns the verification result to the DA 20. If verification is confirmed, then the DA 20 can start processing the payload 14. Verification is preferably done first in order to obtain the keys necessary for decrypting the download stream.
11. The DA 20 begins streaming the payload 14.
12. The packed and encrypted payload buffers are returned from the download server 16 via the DA 20.
13. As the payload 14 is received, the buffers are passed to the codec 22 for processing.
14. The codec 22 decrypts and unpacks the buffers as they are received.
15. The codec 22 returns results as described in more detail below. Operations 11 through 15 are an iterative and multi-threaded process, for example.

The download stream can be processed as it is received. Separate threads are preferably used for downloading and processing the stream.

Pre-Building Download Assistants (DAs) 20

Building the download assistants (DAs) 20 is an important task done by the RED server 10 whereby the server sets the resources and then digitally signs each individual DA. The server 10 can pre-build the DAs 20 during idle time or on a separate system so that, during peak times, the server is free for other tasks.

Different DAs 20 are preferably generated to accommodate different types of platforms, as well as to handle different types of content and/or content delivery options and usage rights (e.g., streaming to a disc, rendering in a media player, installing to an iTunes library, rights to use based on various digital license requirements, and so on). Having platform-specific and material-specific DAs 20 provides flexibility and simplicity to the content delivery system 8 in terms of being able to address the various processing needs and potential issues that can arise when different types of users' operating systems process different types of delivered content 14. Thus, when a user 12 requests a payload 14, the RED server 10 can select and assign to that user 12 one of the DAs 20 best suited for that user's system or platform for receiving the payload and for the type of payload and authorized use. Further, by having the flexibility of the DA 20 loading a selected codec 22, the encryption and decryption of the payload is greatly simplified to allow use of generic decryption routines. In addition, different codecs 22 can be developed for loading into assigned DAs 20 to add additional functionality, flexibility and simplicity to the system 8 by providing the necessary codec processing steps to handle different types of content delivery options.

The first part of this process is to configure each of the DAs 20 with a "download token" in the form of a GUID. The download token is recorded in a database, along with the location of that specific DA 20 on the files-system or even on an external download server. Then, when a DA 20 is needed, the RED 10 server only needs to associate the necessary information including a serial number associated with an order to a known download token and deliver the pre-built DA file. Thus, a serial number does not have to be embedded in the DA 20 at the point of sale. Instead, this information can be fetched from the server at runtime. In other words, when the user purchases a license (e.g., in the form of a serial number) the serial number is associated with the download token, allowing the DA 20 to fetch the serial number and activate the license.

The same download token is used in the Download URL Request (e.g., operation 1 in FIG. 2) to obtain all of the URLs needed by the DA 20 as well as the serial number used to activate the download license.

Figure 3:
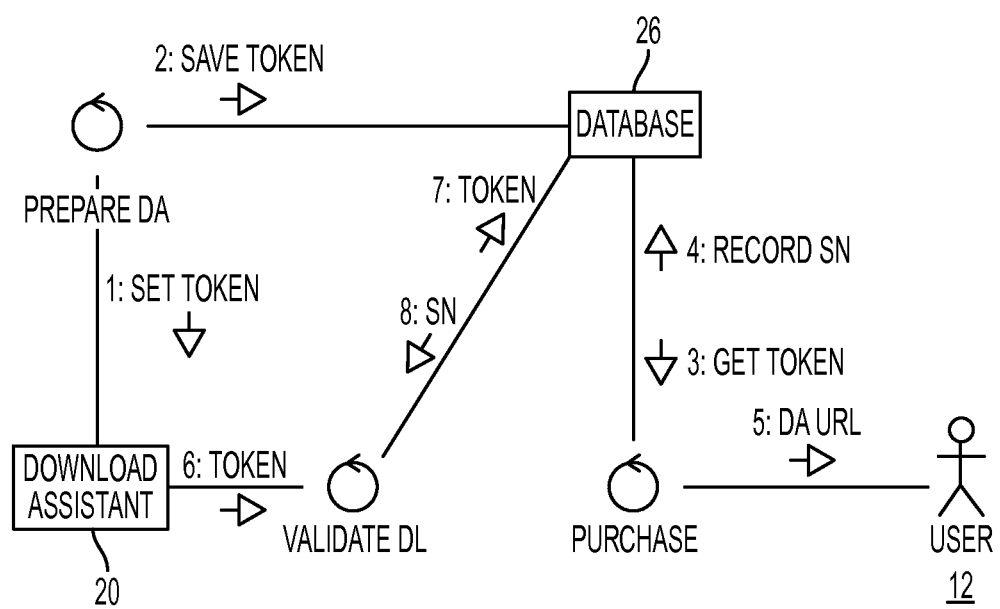
FIG. 3 illustrates download token collaboration in accordance with an illustrative embodiment of the present invention.

FIG. 3 illustrates download token collaboration using the following operations 1 through 8 in accordance with an illustrative embodiment of the present invention.

1. During preparation of the DA 20, the "download token" 24 is set in the resources. At this point, the DA 20 may be placed on an external download server because there is no further need to alter it.
2. The same "download token" (e.g., as used in operation 1 in FIG. 2) is saved in the database 26.
3. During a purchase, the token is reserved for the order; and
4. a serial number for the sale is recorded against the token.
5. The URL for the DA 20 with the token is given to the customer 12.

6. During validation of the download license, the token is recovered from the resources of the DA 20; and 7. the token is sent to the server 10 in the Download URL Request (e.g., operation 1 in FIG. 2).

8. The Download URL response (e.g., operation 2 in FIG. 2) contains the serial number for the order and this is used to verify, and activate the download license needed to decrypt the payload.

DA Configuration Component 32

The RED server 10 can comprise a DA configuration component 32 or interface to prepare the DA 20 with branding information and licensing information in accordance with an illustrative embodiment of the present invention. This represents a significant advantage as licensing information has been separated from purchase-specific preparation to make pre-configuration of a DA 20 possible.

The DA configuration component 32 properties can comprise, but are not limited to, retailer contact information, the retailer's banner graphic and/or icon, and retailer support information in XML. The DA configuration component 32 can set the values specified in the properties to the resources of a given target file, or set the values of the properties from those in the given target file. Further, with the ability of multiple languages in the DA 20, the DA 20 provides for multiple support options based on region or language. For example, the retailer's support information can be XML-based and include unbounded language characteristics.

Payload Creation Component 30

In accordance with an illustrative embodiment of the present invention, a payload creation component 30 (e.g., method and corresponding interface) is provided to prepare a publisher's product for secure delivery via the system 8. The payload creation component 30 can be a software module in the RED 10 or stored externally. The payload construction is advantageous because it does not include any processing instructions beyond how to restore the file(s) and directory structure prepared for the product. This interface packs and encrypts a directory tree into a single file using a given key 28. If a variable (e.g., MaxArchiveSize) is set and the directory tree exceeds the value, the publisher's content package 14 is broken into multiple files (e.g., each with the same name but with a progressive extension such as FileABC.001, FileABC.002 . . . File ABC.n). Once the packaging is finished, there is provided an XML file in the directory with the same name as the payload 14 that contains a list of the archives that were created.

Operations of this interface 30 can comprise specification of the root directory to begin packing or unpacking, a fully qualified file name for the package 14, the size of the package 14 once packed, and the maximum size for the individual archived files.

The payload creations component 30 recursively packs the folders and files at the given root directory and produces an output file. A product item key 28 can be used to encrypt the package. The payload creations component 30 unpacks the file name for the package. The product item key 28 can be used to decrypt the package.

When multiple archives are created, the server 10 needs to know the names that were generated, as well as the order of the files in the archive. To provide this information, the payload creation component 30 preferably outputs a file after the archive is created with XML schema.

Codec 22

In accordance with illustrative embodiments of the present invention, the DLL 22 is used to process the data stream provided by the DA 20. The DLL 22 is called a codec because it is similar to a typical video codec that exposes consistent interfaces to process a video stream and can be downloaded on demand to handle new stream types or to deploy new versions.

The codec 22 replaces the functionality of the Installation Assistant described in U.S. Pat. No. 7,882,037 for license verification and decryption of the payload. In accordance with illustrative embodiments of the present invention, it is designed to allow in-place processing of the data-stream which results in a single footprint for the download (e.g., only one copy of the payload package is needed).

The codec 22 comprises two components: a security library and a directory packer. The security library provides security related-functions including license verification and decryption of the download stream. The directory packer unpacks the download into the original directory structure and files.

Figure 4:
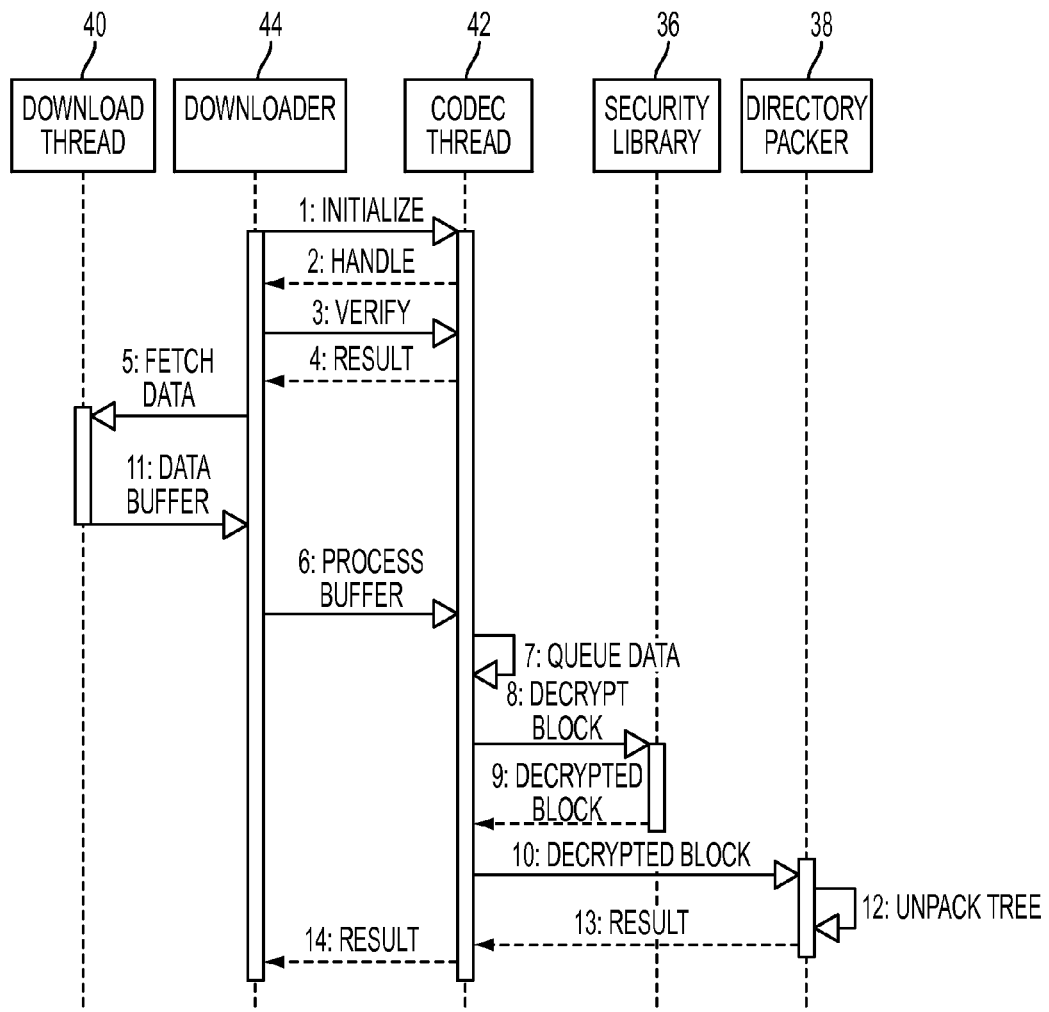
FIG. 4 illustrates implementation of a codec within the context of a download assistant in accordance with an illustrative embodiment of the present invention.

FIG. 4 illustrates implementation of the codec 22 within the context of the DA 20 in accordance with an illustrative embodiment of the present invention. Separate threads 40 and 42 are preferably used, respectively, for the download by the DA 20 and the stream processing by the codec 22, which is an important factor in achieving optimal performance. This implementation allows a relatively slow and non-CPU intensive download to proceed as the system is performing the more CPU intensive tasks necessary to process the stream. FIG. 4 also illustrates the operation of the codec 22 to maintain an internal queue (e.g., operation 7 in FIG. 4) to allow the codec to support not only in-line decryption of the stream, but also streamed block decryption that requires a specific block alignment. In order to perform this implementation independently of the DA 20, the codec 22 queues the data provided through a ProcessBuffer call so it can manage the block alignment.

The codec 22 is not threaded but it is thread safe. That is to say, all calls will block until all processing is complete. It is preferably up to the caller to manage a thread for the codec.

The codec 22 supports both single files, as well as multiple files through the use of a stream handle which is returned by a call InitializeStream. When InitializeStream is called, the codec 22 creates a new class to handle the stream. A pointer to this class is stored in an array (or indexed link-list), and is then returned to the caller as the handle. The handle is used in subsequent calls so the codec 22 can locate the appropriate stream handling class for the call.

As the multi-part archive is actually only one stream of data, the codec does not need to use multiple handles to process it. The multiple parts are assembled into one buffer and then passed to the codec 22 so it appears as one large data stream to the codec.

With continued reference to FIG. 4, a call from a downloader 44 in the DA 20 initializes (operation 1) the codec 22 and a stream processor (e.g., a data streamer 34 as shown in FIG. 1) described in more detail below. A codec thread 42 returns a handle to a codec instance to support multiple simultaneous downloads (operation 2 in FIG. 4). The handle is used in subsequent calls. Parameters can include, but are not limited to: a digital license for the download in encrypted and encoded format, the exact length of the Download License parameter in bytes, a digital license identifier for the download license (e.g., in hexadecimal), the serial number received for the purchase (e.g., through the Response XML), the public key for the publisher (e.g., in hexadecimal), the length in bytes of the public key parameter, and the directory where the stream is unpacked to. As stated above, the return in operation 2 in FIG. 4 is a handle to a codec stream processor wherein all subsequent calls must use this handle.

The digital receipt is verified for proof of purchase (operation 3 in FIG. 4), and a result is returned (operation 4 in FIG. 4). FIG. 4 illustrates that the verification was successful. To verify the download license (operation 3 in FIG. 4), the codec 22 performs a call that verifies the license, allowing the DA 20 to check the validity of the license prior to the download. Parameters can include, but are not limited to: the handle to the stream processor as returned from InitializeStream. Returns (i.e., operation 4 in FIG. 4) can be a standard PSIKey Error Code, among others.

Processing Buffers

With reference to operations 5 and 6 of FIG. 4, the processing buffers function of the codec 22 processes data buffers as they are downloaded from the stream. All processing of the stream is done, for example, in-line to create a single storage footprint in accordance with illustrative embodiments of the present invention.

The downloader requests raw (encrypted data) from the server (operations 5 and 11 in FIG. 4). This occurs in an iterative loop until the end of the stream is reached. The data is passed to the codec for processing (operation 6 in FIG. 4).

The codec queues the data until there is at least one complete packet of block-aligned encrypted data (operation 7 in FIG. 4). When a complete data-block has been received the block is recovered from the queue for further processing. The now aligned block of encrypted data is passed to the security layer (operation 8 in FIG. 4), and decrypted and returned for further processing (operation 9 in FIG. 4). As indicated by operation 10 in FIG. 4, the decrypted block from the previous step is passed to the directory packer (which in this case is actually an unpacker).

The directory packer process the decrypted block of data (operation 12 in FIG. 4). The stream may contain processing meta-data or binary data. Depending on the type of data received, data may be written to disk or processing instructions prepared or executed. The results of the previous step are returned to the codec (operation 13 in FIG. 4), and a final result returned to the downloader (operation 14 in FIG. 4). This may result in feedback to other systems or information displayed to the end user.

The parameters can be, but are not limited to, 1Handle—the handle to the stream as opened; pucBuffer—the buffer as a raw stream of bytes; sBufferLength—the length of the buffer in bytes; 1OffsetStart—the byte at which this buffer starts in the overall stream; 1OffsetEnd—the byte at which this buffer ends in the overall stream; and 1LastByteProcessed—passed by reference so codec knows where to restart if for any-reason the DA stops sending buffers (e.g., Pausing).

In accordance with an illustrative embodiment of the present invention, even if the buffer is accepted and queued for processing, there is no guarantee that all of the data was successfully processed. With each call, this function returns the STREAM OFFSET of the last successfully processed byte in a LastByteProcessed parameter. If the codec DLL 22 is unloaded, the caller resumes the stream starting from this offset. When the caller sends the last buffer of data, this call can, for example, return with the LastByteProcessed parameter value equal to 1OffsetEnd.

Example returns can be, but are not limited to: BufferError—an enumerated type; NoError—the buffer was processed without errors; Resend—there was a problem with the stream that may be fixed by resending the stream starting from 1LastByteProcssed (e.g., this can cover issues such as a bad file CRC by setting this value to the beginning of the file in the steam); Halted—the codec was halted or is in a bad state and is restarted, but it may still be possible to resume the stream); ResetStream—the stream was found to have a critical problem and cannot be resumed and the download is restarted from the first byte; AccessDenied—write access was denied to the target location; InvalidName—the target file or directory name is invalid for the OS; OutOfSpace—there was not enough space for the entire package on the target drive and Confirm Download Complete Messages The Download URL Request is described above in connection with operation 1 in FIG. 2. The Download URL Request is formatted to support the pre-built DAs 20 described above in accordance with an illustrative embodiment of the invention to realize the advantages described herein. The Download URL Request can also comprise additional processing instructions to allow for a data-driven or data-specific system and therefore a more flexible system for secure product delivery. For multi-part archives, the ResponseURL described above in connection with operation 2 in FIG. 2 can comprise <Product> and <Archive> elements to associate multipart archives with individual products and allow for multiple product offerings.

The DA 20 is provided with a download token, which is an abstract identifier that points to all collateral needed by the DA 20. A variable can be used to hold an array of locations for multi-part archives. For single archive products, only one string is used in the array.

The Download URL Response can include, but is not limited to, Location—the location of the (e.g., packed and encrypted) payload, including multiple locations as needed; SerialNumber—the serial number specific to the sale and used during verification of the download license; OfferID—the offer ID needed by the trial wrapper to redirect a purchase; BrandID—the brand ID needed by the trial wrapper to redirect a purchase; Resource—URLs for additional resources (e.g., the type specifies which resource); and Error—an error code and message (e.g., zero for no error).

Payload Structure

The payload 14 contains a copy of deliverables to the end user. The data is streamed in buffers and is processed by a data streamer 34 that can be part of or separate from codec 22 in accordance with an illustrative embodiment of the present invention.

The payload is advantageous over the system described in U.S. Pat. No. 7,882,037 in that it is no longer embedded in an Installation Assistant in accordance with an illustrative embodiment of the present invention, thereby overcoming problems posed by authentication in certain operating systems and problems associated inflexible system versioning options.

For example, when using the default security settings of Windows Vista, the operating system (OS) always makes a copy of an executable file and scans it for potential security risks. This process can take upwards of 20 minutes for a 1 Gigabyte (GB) file. By using a separate payload, there is no longer a huge Installation Assistant that Vista must copy and scan. Further, when the payload was embedded in the installation assistant as described in U.S. Pat. No. 7,882,037, any new feature or bug fix would force a rebuild and redeployment of all of the downloadable packages. This is expensive in terms of CPU usage and network bandwidth. It also carries with it the burden of managing the new version on both the server and desktop. It also forces the server to keep a copy of all gold masters which carries both the burden of storage and security.

Figure 5:
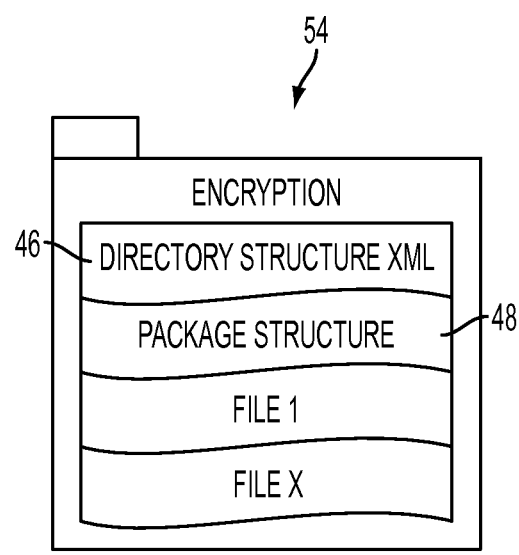
FIG. 5 depicts a payload structure in accordance with an illustrative embodiment of the present invention.

In accordance with an illustrative embodiment of the present invention and with reference to FIG. 5, the payload 34 structure is a simple packed directory structure 46 that is encrypted using standard algorithms. Versioning is now limited to changes to encryption (which is rare), and modifications to the internal package structure 48, which, if well designed, will also rarely change. Even when they do change, it is easier for the RED server 10 to recover the packages from the download server 16 and rebuild them because all processing is external to the package. Because it is possible to recover the packages from the download server 16, it is also possible to eliminate the need to store the gold masters in the database 26.

For example, the payload 14 is an encrypted package 54 containing a packed directory structure 46. The packed directory structure 46 comprises header information describing the hierarchy of the packed directories and a second header section containing information about the files that includes all of the file attributes and their byte offsets in the payload. The remainder of the payload structure 54 is the files (e.g., File 1, ..., File X) appended in the order and at the positions specified by the header.

Figure 6:
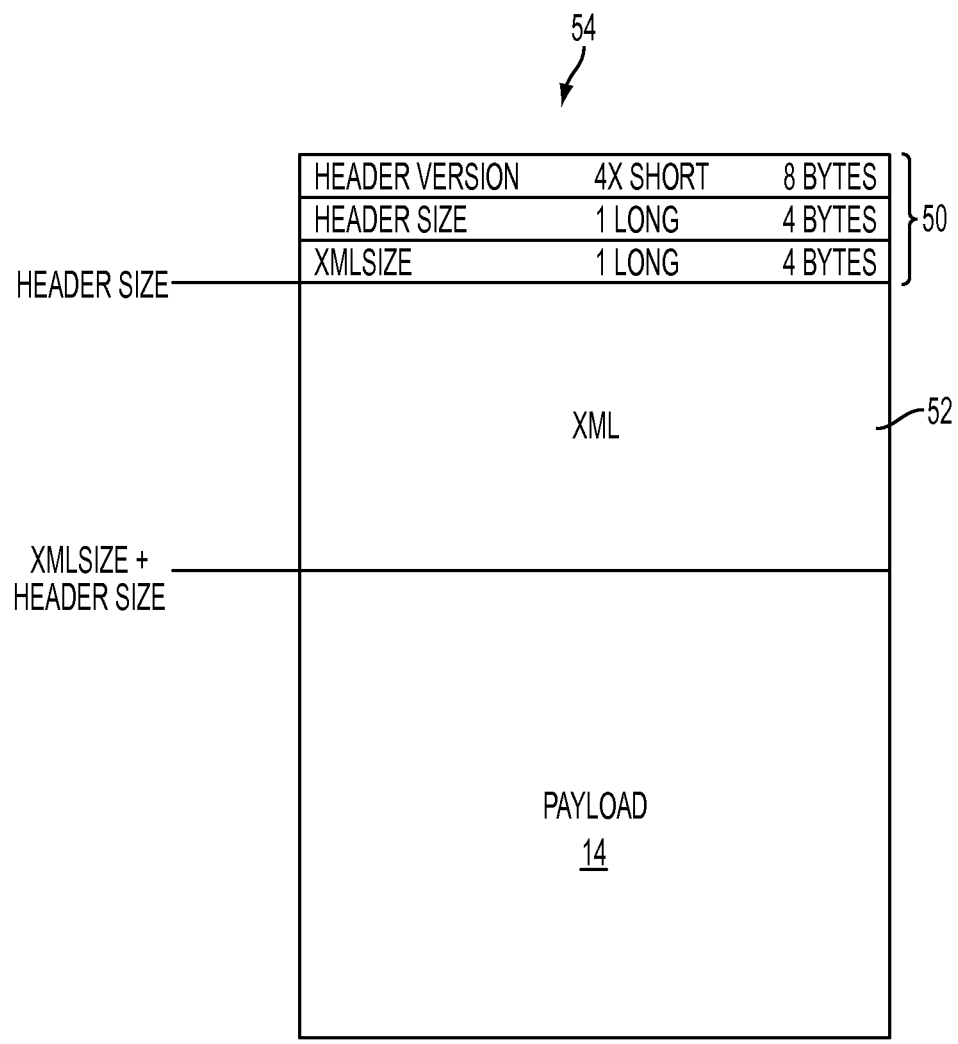
FIG. 6 depicts a structure of a decrypted package in accordance with an illustrative embodiment of the present invention.
Figure 7:
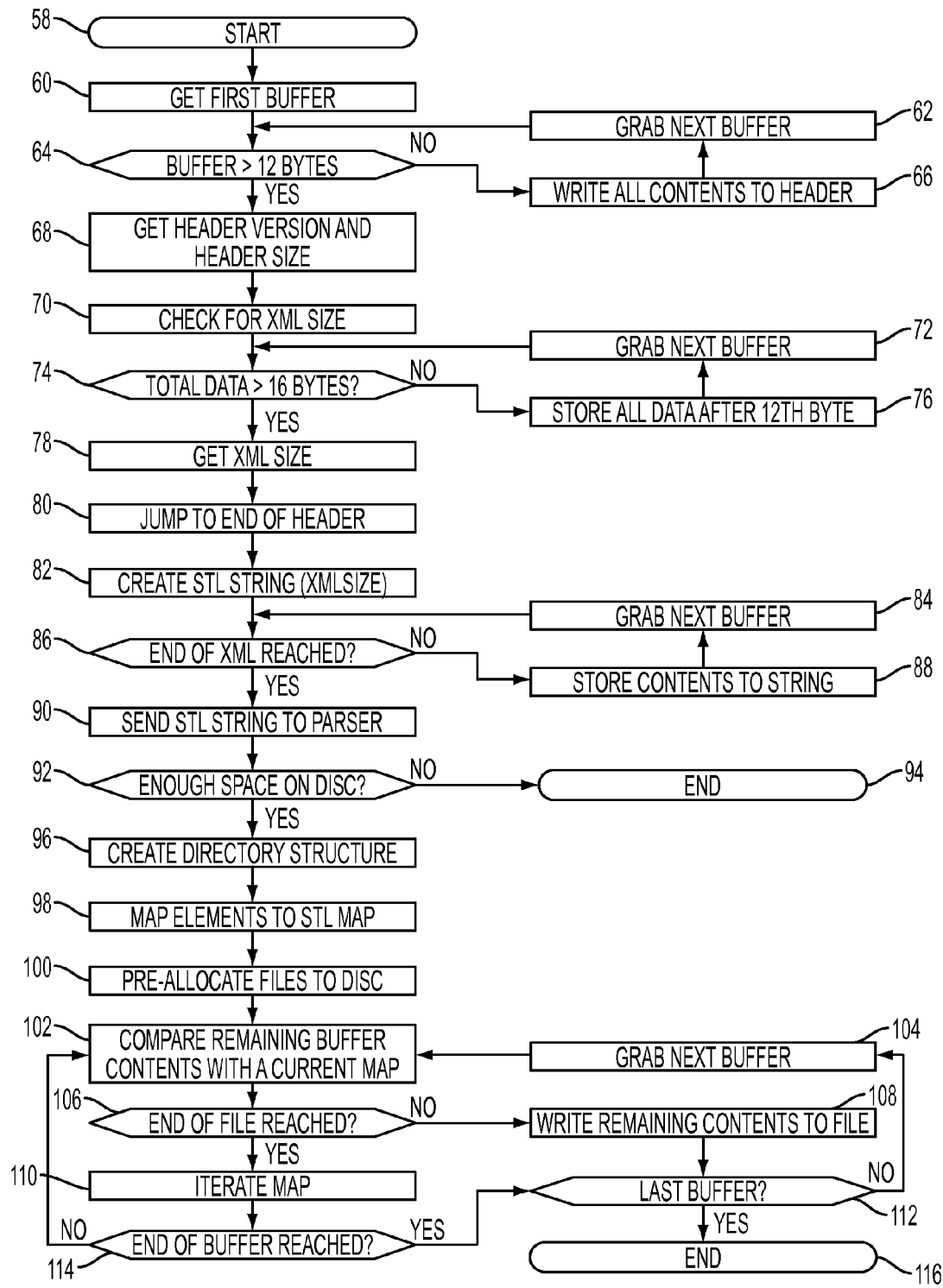
FIG. 7 illustrates a process for unpacking a payload package in accordance with an illustrative embodiment of the present invention.

In accordance with an illustrative embodiment of the present invention, a specific implementation of a payload structure will now be described with reference to FIG. 6, which depicts an illustrative file structure of a decrypted package 14, and FIG. 7, which illustrates a process for unpacking a payload package 54.

A data streamer 34 is provided that can be part of the codec 22, but alternatively can be separate from the codec 22. With reference to step 60 in FIG. 7, the data streamer 34 is sent arbitrary buffers of sequential data. Data is streamed to the codec 22 in buffers, for example, by the DA 20 and the codec has the programmed intelligence to know how to process the incoming data. In the illustrated embodiment, the DA 20 provides the data to the codec 22 for decoding; however, other systems can utilize the codec 22 if they comply with the codec interface. For example, a secure download API can utilize the same codec 22. Information about the buffer is also necessary such as buffer size in bytes, buffer offset start and buffer offset end (e.g., relative to the raw decrypted package), for example. The DA requests blocks of data in a specific range. The codec knows how to process the data depending on the range that was requested (e.g., the data may be the files to download or processing meta-data).

The data streamer 34 is responsible for reading/recording any other information required to extract data from a stream. All Header information and XML data is stored on disc. All information regarding the Payload 14 is in the XML file. The data streamer 34 extracts and parses XML for all data.

As part of the basic workflow, the codec 22 streams decrypted data to data streamer 34. The data streamer 34 then distinguishes three main sections of the payload structure package 54 illustrated in FIG. 6, that is, the header 50, XML 52, and payload 14.

The header 50 contains information on how to unpack the package. For example, the first eight bytes show the version of codec used. The next four bytes points to the end of the header. The next four bytes points to the end of the XML file 52. For this version of the codec 22, this is all the necessary information needed from the header 50.

The header 50 contains data types that cannot be read by single bytes. In case a buffer does not contain the entire head, the buffer is stored in memory and the data streamer 34 waits until the entire header 50 can be read and written to disc, as illustrated in steps 62, 64, 66, 68, 70, 72, 76 and 78. If the header is incomplete, a buffer acknowledged message is returned, but without any indication that return buffer was successfully processed yet. If the DA 20 shuts down before header information 50 has been stored, the DA 20 will automatically restart download from the beginning. For buffers larger than the header size, the rest of a buffer is passed to the XML parser in the codec 22.

The XML document or file 52 contains information on how to reproduce the folder structure of the payload 14, and how to extract data from the streamed payload. Once the header 50 has been extracted, the data streamer 34 knows where the XML data 52 begins and ends in the stream as indicated in steps 80 and 82. The XML 52 is written to a string and is stored to disc on the user desktop 12 to support resuming a download as indicated in steps 84, 86 and 88. Each buffer is checked for the end of XML 52, and all XML data is appended to string and appended to disc immediately. Once entire XML has been extracted, the string is passed to a parser located in the codec 22 (step 90) to process the information.

If the DA 20 crashes, the stream will resume from last successful buffer sent. If the crash occurs after writing XML 52 to disc, the incoming stream starting from the last successful buffer will contain data already stored on disc. To avoid this, the data streamer 34 will need to check offset of incoming buffer and append to appropriate location of XML 52. Alternatively, the data streamer 34 can overwrite starting at the given offset. XML 52 string needs to be loaded from disc. The data streamer 34 can acknowledge buffers and not return finished until the entire XML has been extracted and sent to disc.

Once the XML data 52 has been processed from the stream, it is ready to be parsed. The XML parser in the codec 22 is responsible for creating the file structure and writing the file information to a Standard Template Library (STL) map (steps 98 and 98). The parser also pre-allocates all files to guarantee enough disc space is reserved to write files (step 100). A files element attribute stores the entire payload size. This value can be compared with disc to check for adequate disc space.

If there is not enough disc space (step 92), the data streamer cancels the download which forces the Digital Assistant to restart download on next resume (step 94). The DA 20 also needs to send a message prompting the user that the required disc space is not sufficient and download must be paused or cancelled. The parser can remove all pre-allocated files if error occurs. If space cannot be allocated, there is no reason to store these files to disc since they contain no data.

Each time a download is resumed, the parser can be called to check that the folder structure has not been modified. If the DA 20 was shut down, the STL map has been lost. If the DA 20 resumes the download, the parser is called again to map file information. If folder structure has been modified, an error can be returned to force a restart. The data streamer 34 can also attempt to create missing sub-directories and files but, if payload has been modified, there is no guarantee payload is still valid.

Any remaining buffer information left from extracting XML data from a buffer is sent to process as a part of the payload 14.

As stated above, the payload 14 contains a copy of deliverables to the end user 12. The data is streamed in buffers and is processed by the data streamer 34.

A history of downloaded files and buffers is stored on the DA 20. The codec 22 relies on the DA 20 to know where to a download left off. After each buffer has been successfully written to disc, a return message is sent to the DA 20 stating the buffer has completed. It is up to the DA 20 to store this information in the event that it is shut down and a download must resume.

Writing the payload to disc or the user desktop 12 requires the folder structure to have already been created and the file information written to a STL map. Each incoming buffer is compared with the STL map to know what file(s) and which byte to begin writing the buffer contents to disc.

If a crash occurs, the data streamer 34 does not store any information regarding the buffer that crashed. The DA 20 sends a buffer with offset start and offset end. With the file map and buffer information, the data streamer 34 can determine what file to write to (steps 102, 104, 106, 108, 110, 112 and 114). The data streamer 34 can record the last file successfully written to disc by storing the key from the STL map. The key can provide a faster means to finding which file to begin writing to from a buffer. Buffer offsets continue to be used to verify the actual file to write.

If the DA 20 closes or crashes, the XML 52 needs to be parsed again. The directory structure can be checked in the event that the user modified the payload directory tree.

CRC checksum can be performed for each file. After each file has been completed (step 106), CRC checksum is performed.

When resuming a download, the data streamer 34 will assume the payload 14 has not been modified by user. If data streamer 34 attempts to write to a file that does not exist, the payload 14 has been modified and is considered corrupt. The DA 20 will report an error message and force a restart. A user 12 should not be modifying the payload 14. The data streamer 34 can perform a check against the payload 14 to detect corruption.

The interfaces between the DA 20, the codec 22 and the data streamer 34 will now be described in accordance with an illustrative embodiment of the present invention.

The codec 22 has minimal responsibility over the data streamer 34. For example, the codec 34 need only use the calls initialize, process buffer, and destructor. The data streamer 34 will return buffer acknowledged, buffer complete, and buffer error. The data streamer 34 is, for example, a class to be called by the codec 22.

For Example:
DataStreamer DataStreamer( )
Constructor: called when codec 22 is initialized. Data streamer 34 needs to wait for DA 20 to initialize the object to know the download state.
bool init(string sRootDir, long LastSuccessfulByte);
Before the DA 20 can send buffers to the codec 22, the data streamer 34 needs to know the current state of unpacking. This is necessary for resuming download when in a paused state or when the DA 20 and codec 22 are shut down. Information from the DA 20 needs to be compared with data stored on disc 12.
Inputs:
LastSuccessfulByte is returned each time a Buffer has been processed.
DA 20 needs to initialize this value to 0 and pass to codec 22 before init( ) can be called.
DataSteamer needs to know the root Directory of the payload.

```
BufferErrorMsg ProcessBuffer( Byte * buffer, long BufferSize, long
    BufferOffsetStart, long BufferOffsetEnd, long *
    LastSuccessfulByteOffset);
enum BufferErrorMsg {
    Processed,
    Not_enough_disc_space,
    Invalid_Header_Data,
    Invalid_XML,
    XML_not_found,
    Directory_not_found,
    File_not_found,
    File_failed_to_open,
};
```

Once the data streamer 34 has been initialized, it is ready to process incoming buffers.
Long*LastSuccessfulByteOffset is a pointer to a long that stores the last byte that was successfully written to disc from ProcessBuffer. The value of the long is to be sent to DA 20 and to be updated when DA 20 calls init( ).
If a buffer is acknowledged but has not written the data to disc, then LastSuccessfulByteOffset will return the same value as before.
Errors:
0. Processed
1. Not enough disc space
2. Invalid Header Data
3. Invalid XML
4. XML not found
5. Directory not found
6. File not found
7. File failed to open
8. CRC failed The data stored to disc can be, but is not limited to, a header 50 (e.g., Header version, header size, XML size), XML 52 (e.g., XML string) and payload 14 (e.g., file map key, file name, and file directory).

To create a download package 14, a user can upload a single executable or a zip file, for example, to the server. To download the package by the DA 20, a class PackageDeliverables can be used. For example:
bool PackageDirectoryTree(string sDirectory, string sPackageName);

In accordance with illustrative embodiments of the present invention, the entire directory tree is scanned. All files and folders in the directory are packaged. A file with the name sPackageName is written to disc in the directory one level up from the sDirectory. For example:

```
sPackageName = "temp.dat"
sDirectory = "C:\Windows\temp\product a"
Output file: "C:\Windows\temp\temp.dat"
```

When resuming a download, files already written to disc can be checked against their checksum for integrity. If a file that has already been streamed is corrupt, the entire payload is corrupt and is restarted. All files have been pre-allocated. If any file is removed and DA 20 attempts to write data to the missing file, the payload 14 is corrupt and must restart download. The user should not be modifying the payload 14 while downloading. The maximum size on an individual file can be 4 GB, for example, because buffer offsets and size are stored in a LONG. There is, however, no limit on the size of an entire package due to the multi-archive operation in accordance with illustrative embodiments of the present invention. The limit on an individual file in the archive set is still 4 GB but there can be thousands of files in the set.

The total size of package consists, for example, of the header, XML and payload. The Header can be 16 bytes, for example. The XML size depends on the folder and file structure.

The data streamer 34 can store the last processed buffer offset on disc to be compared with DA 20. Each time the data streamer 34 completes a buffer and sends the last offset to the DA 20, the offset can be stored on disc. When resuming download, the offset values can be compared with DA 20 to make sure the DA 20 and codec 22 are still in sync.

Illustrative embodiments of the present invention have been described with reference to a RED server 10, a DA 20, a codec 22, a data steamer 34, among other components. It is to be understood, however, that the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

While the invention has been shown and described with reference to a certain embodiment thereof, it is understood by those skilled in the art that various changes in form and details may be made therein without departing from the spirit and scope of the invention. Consequently, the scope of the invention should not be limited to the embodiment, but should be defined by the appended claims and equivalents thereof.

What is claimed is:

1. A method of preparing encrypted content for delivery to users, content being stored at a server for delivery to users upon request and encrypted, comprising:
    storing a plurality of download assistants and a plurality of codecs;
    receiving a request for selected content from a user;
    generating an order to deliver the selected content to the user and an order number to identify the order;
    selecting a download assistant from among the plurality of download assistants to facilitate the fulfillment of the order, and selecting a codec from among the plurality of codecs;
    transmitting to the user a link corresponding to the selected download assistant for accessing the selected download assistant;
    providing the download assistant with the order number, a link to the selected codec, and a link to the selected content;
    retrieving the selected codec; and
    streaming the selected content and iteratively placing the selected content into buffers via the selected download assistant and decrypting and unpacking the buffers via the selected codec while streaming to provide the selected content to the user.

2. A method as claimed in claim 1, wherein the streaming comprises employing separate threads for the selected download assistant and the selected codec, respectively, to stream the selected content into buffers, and to decrypt and unpack the buffers.

3. A method as claimed in claim 1, wherein the plurality of download assistants comprises at least two different download assistants for managing at least one of different platforms, different user devices, different operating systems, different methods of rendering content for the user, and different types of content.

4. A method as claimed in claim 1, wherein the plurality of codecs comprises at least two different codecs to handle at least one of different types of content, and different methods of rendering content for the user.

5. A method as claimed in claim 1, wherein the payload for the selected content is prepared for storage on the server by packing and encrypting a directory structure containing at least one of a file and digital media into an archive.

6. A method as claimed in claim 5, further comprising dividing the payload into multiple archives with a descriptor that lists the archives when the at least one of a file and digital media exceed a selected size limit.

7. A method as claimed in claim 6, wherein the streaming further comprises employing the descriptor to facilitate unpacking the buffers.

8. A method as claimed in claim 1, wherein the selected codec is a dynamic link library (DLL).

9. A method as claimed in claim 1, further comprising providing the download assistants with corresponding tokens when they are pre-built and stored, associating a token corresponding to the selected download assistant with the order number, wherein providing the download assistant with a link to the selected codec and a link to the selected content occurs upon verification of the download assistant using the token.

10. A method as claimed in claim 1, wherein the selected codec can also be used by a secure download API, and the download API and the selected codec can perform streaming of the payload.

* * * * *